United States Patent
Bürger

[11] Patent Number: 5,895,845
[45] Date of Patent: Apr. 20, 1999

[54] METHOD AND GAUGE FOR MEASURING THE TREAD DEPTH OF A MOTOR VEHICLE TIRE

[76] Inventor: Joachim Bürger, Pinedale House, Curracloe-Kilmacoe, Country Wexford, Ireland

[21] Appl. No.: 08/776,360

[22] PCT Filed: May 24, 1996

[86] PCT No.: PCT/EP96/02241

§ 371 Date: Jan. 24, 1997

§ 102(e) Date: Jan. 24, 1997

[87] PCT Pub. No.: WO96/37754

PCT Pub. Date: Nov. 28, 1996

[30] Foreign Application Priority Data

May 31, 1995 [DE] Germany .................. 295 08 978 U
May 26, 1995 [DE] Germany .................. 195 19 423

[51] Int. Cl.[6] .................................................. G01B 11/02
[52] U.S. Cl. .......................... 73/146; 356/3.08; 356/356
[58] Field of Search ......................... 73/146; 356/3.08, 356/356

[56] References Cited

U.S. PATENT DOCUMENTS

| | | | |
|---|---|---|---|
| 3,918,816 | 11/1975 | Foster et al. | 73/146 |
| 4,564,737 | 1/1986 | Burke et al. | |
| 4,731,136 | 3/1988 | Risi | 73/146 X |
| 4,773,011 | 9/1988 | VanHoose | 73/146 X |
| 5,054,918 | 10/1991 | Downing et al. | |
| 5,245,867 | 9/1993 | Sube et al. | 73/146 |
| 5,789,668 | 8/1998 | Coe et al. | 73/146 |
| 5,790,243 | 8/1998 | Herr | 356/5.1 |

Primary Examiner—Ronald Biegel
Attorney, Agent, or Firm—Mallinckrodt & Mallinckrodt

[57] ABSTRACT

For measuring the tread depth of the tyre of a motor vehicle by means of a measuring head containing a laser (67), the laser measuring head is positioned relative to the tyre of the motor vehicle in such a way, that a reference surface or plane adopts a well-defined position with respect to the tyre. The laser beam (66) of the laser (67) is directed through the reference surface (68) at an angle ($\alpha$) to the bottom (64) of the tyre tread, whereby a light spot (78) is generated on this bottom (64) of the tyre tread. The position (e) of the light spot (78) is observed by an image resolving sensor (82). Therefrom, a measure (t) of the depth of the tyre tread is gained.

14 Claims, 9 Drawing Sheets

Fig.5

METHOD AND GAUGE FOR MEASURING THE TREAD DEPTH OF A MOTOR VEHICLE TIRE

TECHNICAL FIELD

The invention relates to a method and a measuring device for measuring the tread depth of of a tyre of a motor vehicle comprising:

(a) a laser for generating a laser beam, which is directed to the tread surface of the motor vehicle tyre to generate a light spot thereon;

(b) an image resolving sensor arranged to observe the position of the light spot; and (c) signal processing means designed to generate, from position data, a measured value indicative of the tread depth of one or more tread grooves of the tyre tread.

The tread pattern of tyres of motor vehicles is a quite essential safety feature. The tread of the tyre permits rain water on the road surface to flow off laterally, whereby floating of the tyre and loss of ground contact (aquaplaning) is avoided. This is of particular importance with modern passenger cars driving at high velocity. Therefore, a minimum depth of the tread is laid down by law in many countries. In Germany, for example, this minimum depth is 1.6 millimeters. Even with a tread depth of less than 3.0 millimeters, the water displacement is reduced by 30 percent of the value obtained with new tyres. The tread of motor vehicle tyres is subjected to heavy wear. This wear can, however, only difficultly be recognized by the owner of the vehicle. Tread depth is measured, if at all, from time to time in a repair shop, where measuring instruments for the measurement thereof are available.

PRIOR ART

German patent application 4,316,984 discloses a method and a device for automatically determining the tread depth of motor vehicle tyres. A partially transparent measuring plate is provided on the floor of a measuring station. A measuring head is located below the measuring plate. The measuring head has a laser and an image resolving sensor as a triangulation unit. In order to measure the tread depth, the tyre rolls over the measuring plate or the tyre is placed on the measuring plate. Then, the laser generates a light spot on the tread surface. The position of the light spot is observed by the sensor. The output signals from the sensor are applied to a signal processing unit, which determines the measure of the tyre tread. The measuring head is mounted on a carriage and is movable transversely to the rolling direction of the tyre.

With the device described in this German patent application 4,316,984, measurement of the tyre tread, necessarily, takes place under load, whereby the tread bars of the tyre tread are radially compressed in the region of the contact area of the tyre. In order to avoid a falsified measuring result, the laser is aligned such that the laser beam hits the tyre tread outside the contact surface of the tyre.

In order to be able to determine the tyre tread also with contaminated tyres, an outlet nossle for water directed to the tyre tread is provided in the region of the measuring plate, which directs a jet of water onto the tyre tread before or during measurement. Furthermore, a self-cleaning equipment is provided, which is to clean the measuring plate itself contaminated by the cleaning of the tyre.

This automatic device cannot ensure that an area of the tyre representative of the tyre tread is scanned. Therefore, in order to increase the probability of a representative measurement, a number of measuring plates and measuring heads are provided one behind the other in the rolling direction of the tyre.

German patent application 1,809,459 described a method and a device for automatically determining the tread depth of motor vehicle tyres in moving traffic. The measuring principle is similar to the measuring principle described in DE 4,316,984. A slot-shaped opening is provided in the road surface. A measuring device is arranged in a pit under this opening. A photoelectric contact is actuated by the tyre to be measured. This contact triggers an electronic flashlight. A narrow light strip is generated by the electronic flashlight. The light strip is sharply imaged on the tyre surface through the slot-shaped opening. Because of the tread of the tyre surface, the light strip is reflected as a stepped line, the height of the steps being proportional to the tread depth. The stepped light strip image is imaged on a photographic layer at an enlarged scale by a telescope and a camera lens objective. Part of the imaging light beam is reflected through a semi-transparent mirror on a sensor which consists of a raster of photoelectric detector elements. An electronic signal processing unit determines the step heights and, thereby, the tread depth from the output signals of the photoelectric detector elements.

European patent application 0,469,948 describes also a device for automatically determining the tread depth of motor vehicle tyres in moving traffic. Also here, a light spot is generated on the tyre surface by a laser. The light spot is observed by an image resolving sensor. The measuring device is located below the road surface. An opening covered by a window is provided in the road surface. A plurality of measuring units are provided one behind the other in the direction of traffic movement.

Prior Art mobile measuring devices for measuring the tread depth of parked motor vehicle tyres operate mechanically with a plug gauge. German utility model 7,640,078 describes such a measuring device with a guide body and a measuring pin, the measuring pin being slidably guided in the guide body, being spring-loaded and being arranged to be inserted into the tyre tread. If the tread depth is smaller than a selected value, a lamp is connected with a battery through the measuring pin, whereby a lamp is lit. Similar measuring devices, which operate in accordance with the same mechanical principle with a measuring pin, are disclosed in German patents 2,722,137 and 3,827,456.

German patent application 2,206,743 discloses an automatic tread depth measuring system for tyres of motor vehicles. Measuring probes are provided in the form of pins which project from a carrier plate and are vertically movable and spring-loaded. The pins are pushed down by the tread projections of the motor vehicle tyre, if the tyre is located on the carrier plate. An electric microswitch is associated with each pin. Depending on the projecting or pushed down positions of the pins, a "passed" or "not passed" signal is outputted.

German patent application 2,113,522 describes a method for the contactless measurement of a surface profile. Laser beams emerging from a laser transmitter are deflected row by row on the surface by means of an acousto-optical light deflector. The laser beams diffusely reflected by the surface impinge upon a detector through a light-stopping and focussing optical system. The surface profile is determined electronically from the reflecting or receiving angles, respectively. The laser and the detector are arranged on a horizontal line. The emitted rays form an angle α with this line, and the received rays form certain angles β therewith. From these angles α and β and from the known distance of the verteces of these angles, the distances of the profile surface from the reference line are determined trigonometrically.

DISCLOSURE OF THE INVENTION

It is an object of the invention to provide an improved method and an improved measuring device for measuring the tread depth of motor vehicle tyres which permit accurate and reliable measurement of the tread depth.

A more specific object of the invention is to provide a measuring device of this type which permits routine surveillance of the treads of motor vehicle tyres, for example by checking the tread depth of parked vehicles.

According to the invention, these objects are achieved by a method for measuring the tread depth of a motor vehicle tyre by means of a laser measuring head containing a laser, wherein (a) the laser measuring head is brought manually into engagement with whereby the motor vehicle tyre a reference surface adopts a well-defined position relative to the tyre, (b) the laser beam of the laser is directed through the reference surface at an angle onto the ground of a tread groove, whereby a light spot is generated ground on the of the tread groove, (c) the position of the light spot is observed by means of an image resolving sensor and a measure of the depth of the tyre tread is derived therefrom, and (d) the laser measuring head is swept manually over the tyre tread to generate measured values of a plurality of tread grooves, from which a measure of the tread depth is determined.

With respect to the measuring device, the objects are achieved, in accordance with the invention, in that (d) the laser and the image resolving sensor are accommodated within a common housing to provide a laser measuring head; (e) the laser measuring head has an engagement surface permitting the laser measuring head to be brought into engagement with the motor vehicle tyre, whereby the laser and the image resolving sensor are positioned in a well-defined position relative to the motor vehicle tyre; (f) the measuring device furthermore comprises ($f_1$) a printer for printing output data indicative of tread depth; and ($f_2$) a battery for the power supply of the laser of the sensor and of the printer; and (g) the measuring device is a mobile unit.

Thus the measuring device is a mobile unit. It can be moved manually. The laser measuring head is not stationary in an automatic installation, but for the measurement is manually swept across the tyre tread. Thereby it becomes possible to conveniently carry out the tyre tread measurements on motor vehicles which are parked at any location, for example on a parking lot. It is not necessary to drive a car exactly over a stationary installation.

With stationary installations, the measuring result is falsified by a number of factors. For example, it is not ensured, that the measured area of the tread is actually representative of the tyre. It might be, that the tread is not detected, at all, by the stationary measuring installation but only a tread-less area of the tyre. Furthermore, the measuring result is falsified by contamination, there being no way of detecting this. Also expensive tyre cleaning installations are not able to reliably avoid such falsification. Small gravel, which might have been clamped in the tyre tread, cannot be removed by such installations. With the method and device of the invention, such falsifications are avoided in simple way by permitting a visual inspection prior to, during and after the measurement. Prior to the measurement, the operator can select an area to be measured which is not contaminated, does not contain gravel and is representative of the whole tyre tread. The operator is also in the position to check the result for plausibility on the spot immediately after the measurement, whereby no falsified measuring results are presented to the vehicle owner.

When the measuring device of the invention is used, it is also possible to select the spacing between laser and sensor, on one hand, and the tyre surface, on the other hand, substantially smaller than in stationary installations. Thereby, the measuring accuracy is improved.

As the laser measuring head is guided manually across the tyre tread, it is possible to measure a plurality of tread grooves in one measuring procedure. The individual measured values may then be processed such that a single measured value for the tyre is generated which is predicative of the relevant tread depth.

For the mobility of the measuring device, it is advantageous, if the whole measuring device is accommodated within one single housing. It is, however, also possible, if desired, to accommodate the components in different units, for example to attach the laser measuring head to a rod and to accommodate battery and printer in a housing, which is either carried by a shoulder strap or can be pulled as a cart with wheels.

The laser measuring head can be consecutively brought into contact with all tyres of a motor vehicle, whereby all tyres of the motor vehicle can be measured. The signal processing means then provide the tread depths. These tread depth are printed out by means of the printer. Tyres of parked vehicles can be checked in a simple way, and the vehicle owner can be notified of defects, if present, by a printout of the printer. Thereby an essential contribution to traffic safety can be made.

Modifications of the invention are subject matter of the dependent claims.

Embodiments of the invention are described hereinbelow with reference to the accompanying drawings.

BRIEF DESCRIPTION OF THE DRAWINGS

FIG. 5 is a schematic illustration and demonstrates the mode of operation of the laser measuring head.

FIG. 7 is a flow diagram and illustrates the course of the measurement of the tyre tread depths with a mobile measuring device of the invention.

PREFERRED EMBODIMENTS OF THE INVENTION

Figure 1:
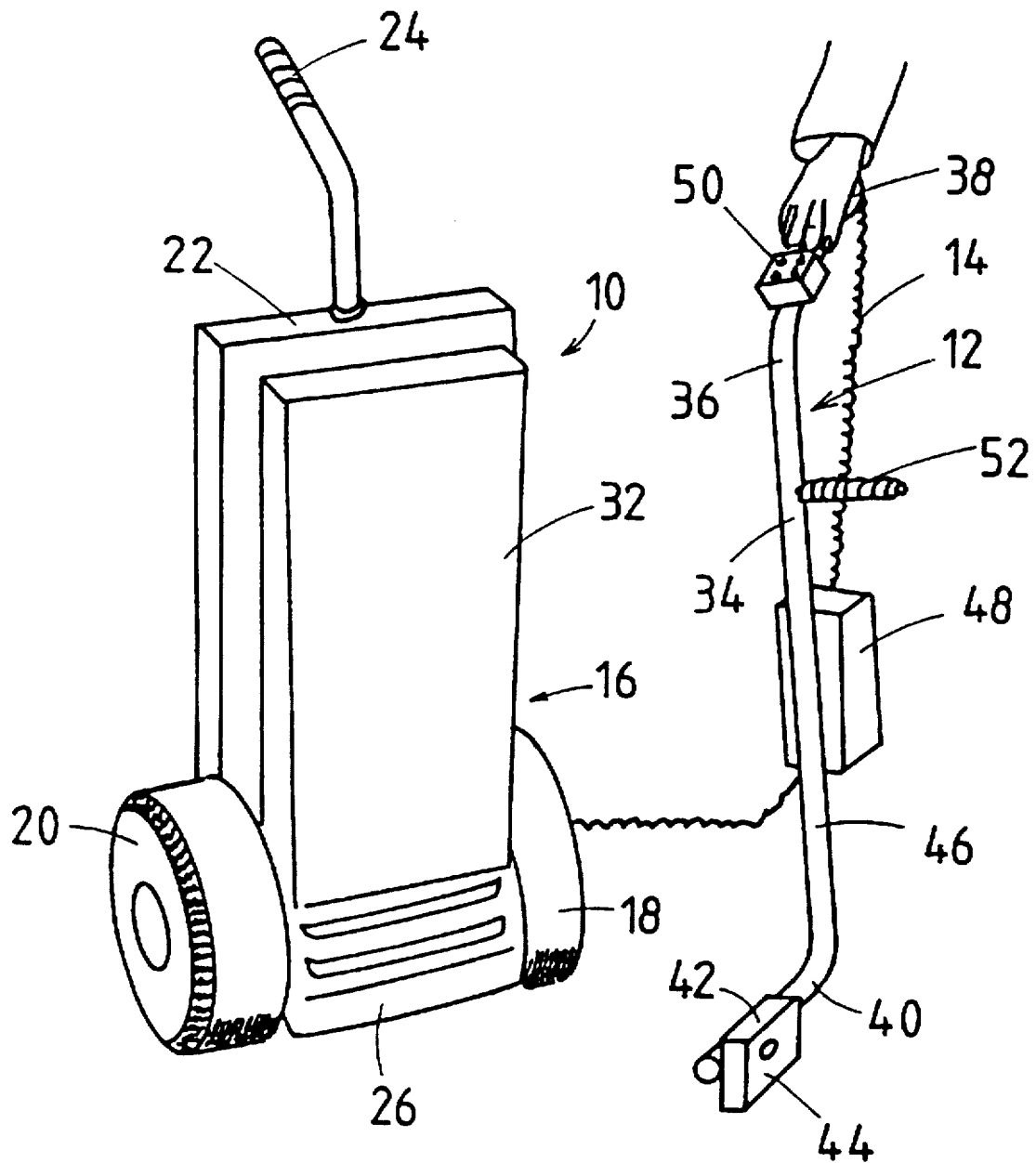
FIG. 1 is a perspective view of one embodiment of a mobile measuring device for measuring tread depth of tyres of motor vehicles.

Referring to FIG. 1, the mobile measuring device includes a main portion 10 and a measuring head portion 12. The measuring head portion 12 is connected to the main portion through a coiled cable 14.

The main portion 10 is mounted on a two-wheeled cart 16. The cart 16 has two wheels 18 and 20, a rear wall 22 with a handle 24 rigidly attached thereto and supports 26. The cart can be tilted to the rear in FIG. 2 by means of the handle 24 like a sack barrow and can be moved on the wheels 18 and 20. The cart can, however, also be tilted forward for putting it down, so that it rests on the supports 26.

Figure 2:
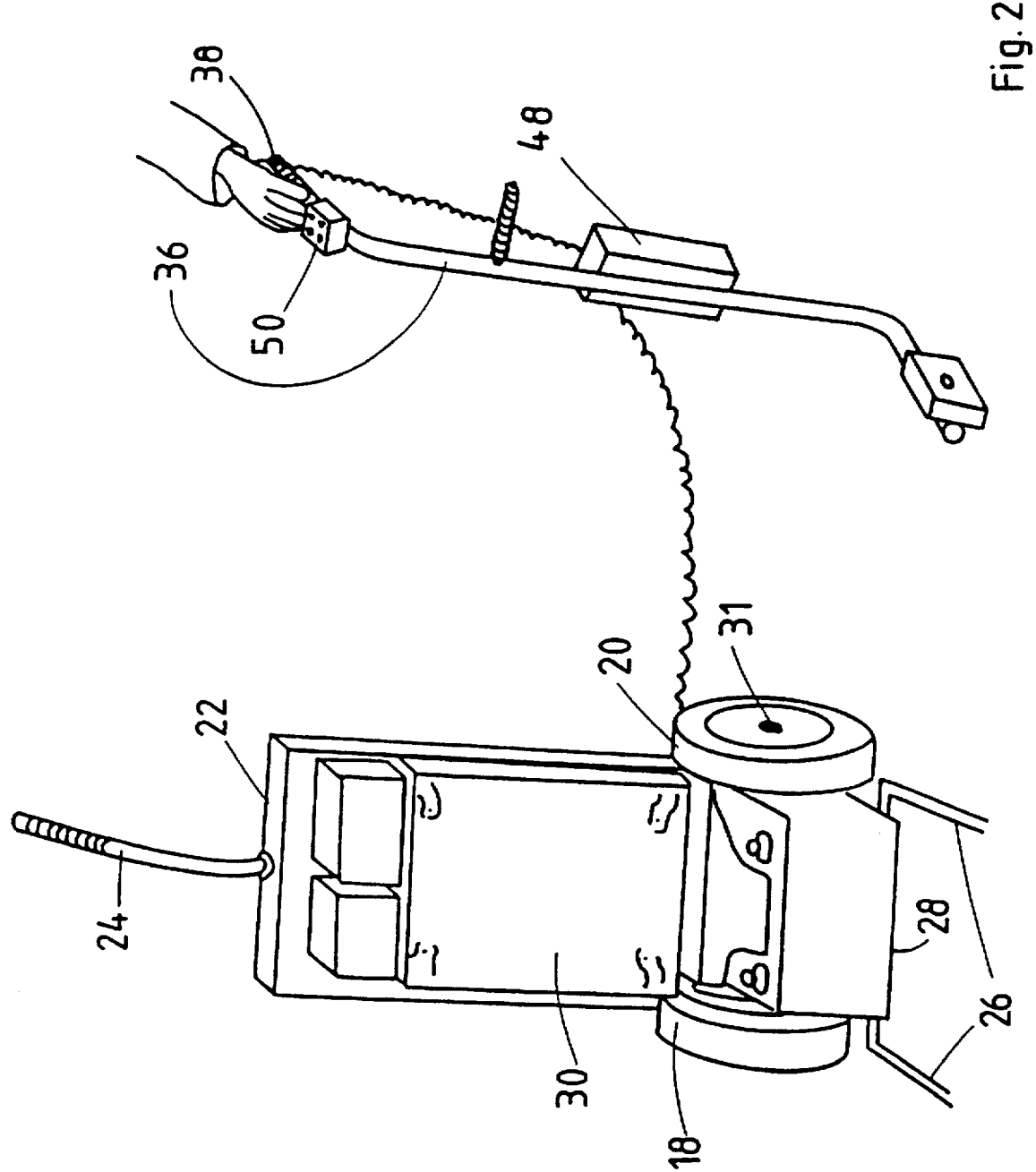
FIG. 2 illustrates the measuring device if FIG. 1 with the hood removed, whereby the battery and the printer can be seen.

The main portion 10 contain a leak-proof battery 28 and a printer 30 (FIG. 2). The battery 28 is located at a deep level. The center of gravity of the battery is located in front of the axle of the wheels 18 and 20. Thereby, the whole assembly is stable. The cart 16 tends to support itself on the supports 26, even if the handle is released.

Above the leak-proof battery 28, the main portion has the printer 30. The printer serves for printing out measuring protocols. The battery and the printer are covered by a hood 32, which, in FIG. 2, has been removed but which can be seen in FIG. 1. The hood 32 can be made of plastics or metal. The hood has a lateral delivery slot for delivering printed-out measuring protocols.

The measuring head portion includes a z-shaped rod 34. At its normally upper end, the rod 34 has a knee in the form of a handle end 36 extending at an obtuse angle. The handle end 36 carries a handle 38. The lower "measuring head end" 40 of the rod 34 forms a knee extending at an obtuse angle opposite to the handle end 36, whereby it extends substantially parallel to the handle end 36. A laser measuring head 42 is attached to the measuring head end 40. The laser measuring head can engage a motor vehicle tyre with its side face 44. The laser measuring head 42 contains a laser, with the aid of which the tread depth of the tyre is measured.

A control and signal transfer unit 48 is attached to the straight central portion 46 of the rod 34. An operator device 50 with four control members is attached to the handle end 36. These control members serve to input the position of the respective measured tyre, such as "front right". The control members of the operator device 50 are four push-buttons, as can be seen from FIG. 1. Furthermore, a handle 52 is attached to the central portion 46. The handle extends orthogonal to the central portion 46 and substantially orthogonal to the plane defined by the central portion 46, the handle end 36 and the measuring head end 40.

Figure 3:
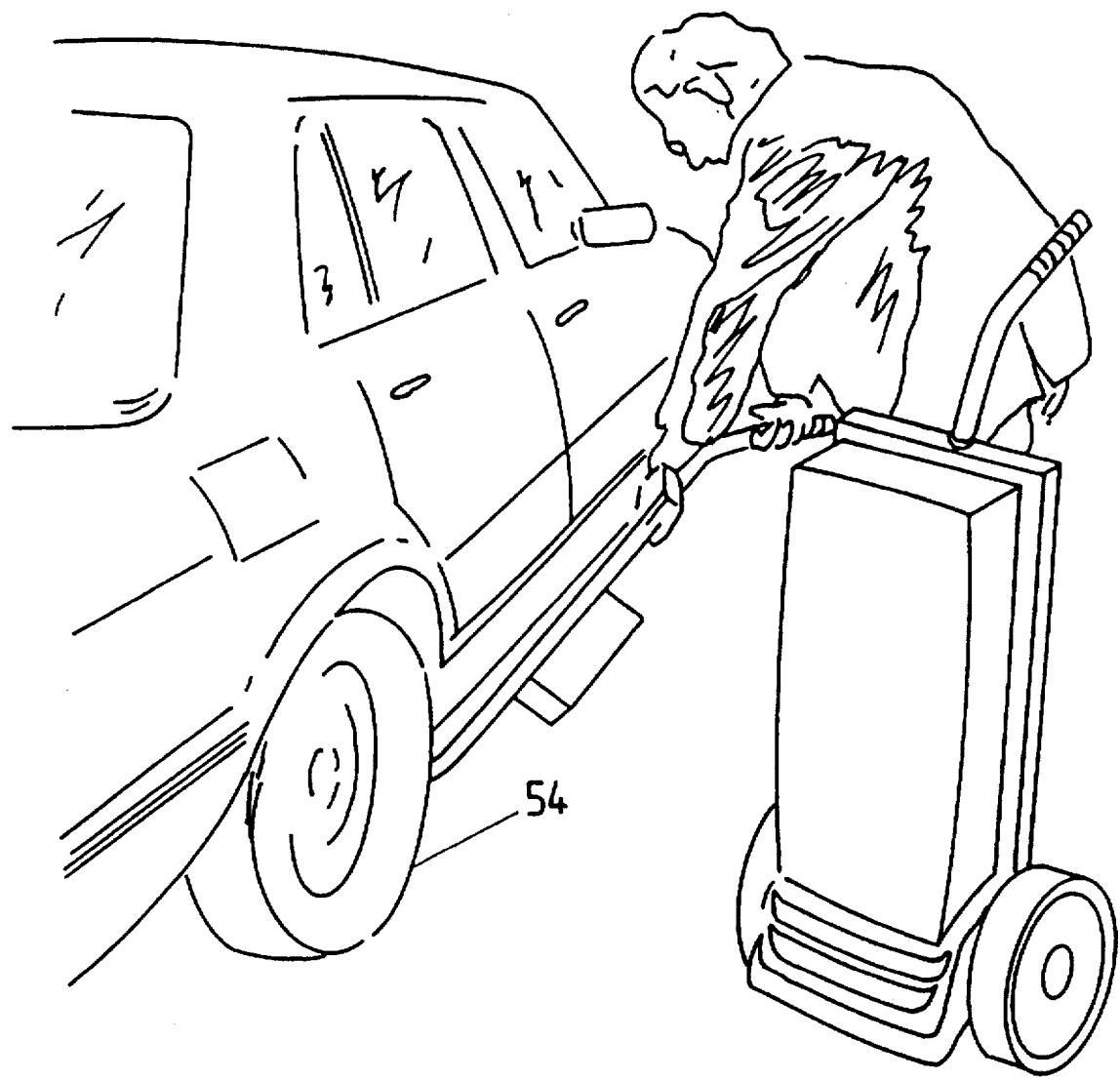
FIG. 3 is a perspective view and illustrates the use of the mobile measuring device of FIGS. 1 and 2 at a parked motor vehicle.

FIG. 3 illustrates the use of a measuring device of the present type for measuring the tread depth of the tyres of a parked motor vehicle. The measuring head 42 is moved across the tread of the tyre 54. The rod can conveniently guided by means of the handles 38 and 52. The laser measuring head is attached to the rod 34 in such a way that the user can move the measuring head conveniently across the tyres 54. During this procedure, the user may remain upright. The measurement is made in similar way at all four tyres of the motor vehicle. The four control members of the operator device 50 permit inputting which of the four tyres is presently being measured.

Figure 4:
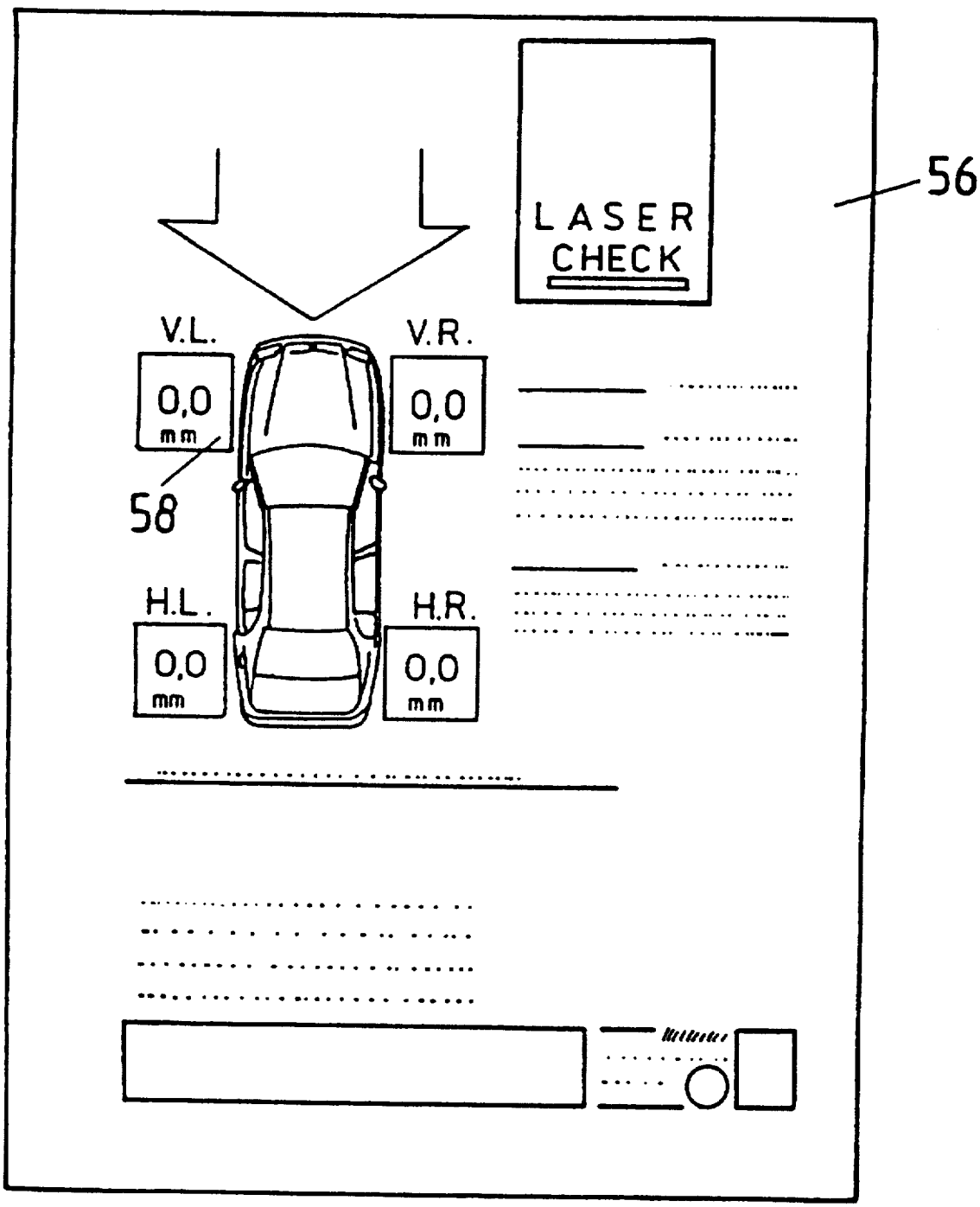
FIG. 4 shows a printout as provided by the mobile measuring device of FIGS. 1 to 3.

FIG. 4 shows a printout as provided by the apparatus just described. A form 56 contains a drawing of a motor vehicle and four fields 58. The four values of the tread depth measured at the four tyres are printed into the fields 58 by the printer. The control members of the operator device 50 select the field 58 into which the printer 30 is to print the respective measured value.

Figure 5:
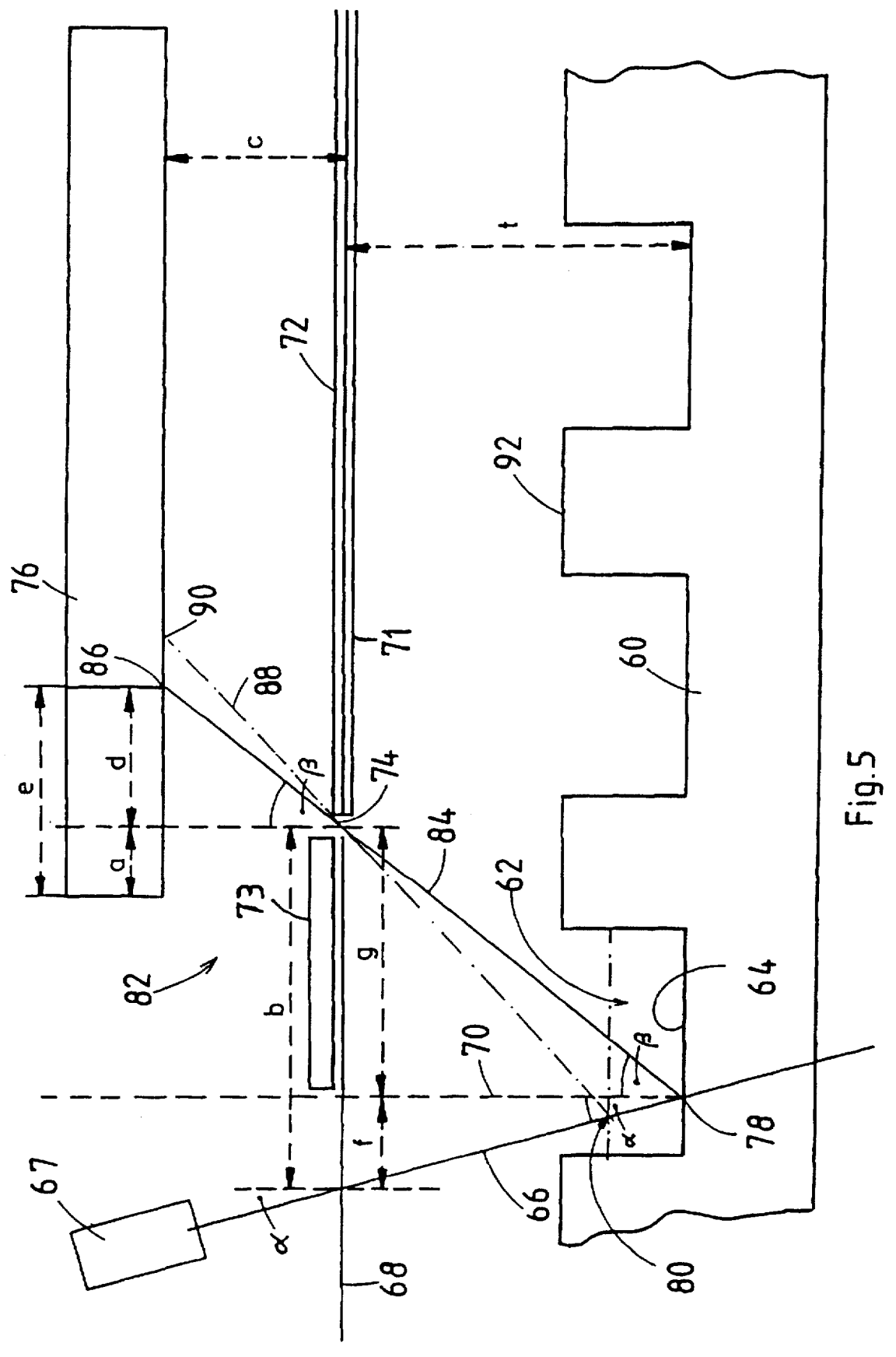

Referring to the schematic FIG. 5, numeral 60 designates a tyre which has a tyre tread with tread grooves 62. The tread grooves define a bottom 64. A reference plane 68 is defined by the surface of the tyre between the tread grooves 62. The laser measuring head 42 keeps this reference plane 68 at a well-defined distance from the surface of the tyre. The laser beam 66 forma an angle α with the normal 70 to the reference plane 68 and with the bottom 64 of the tread groove 62. The angle α ist selected such that the laser beam, at least in certain relative positions of the measuring head 42 and the tyre, can penetrate into a tread groove down to the bottom thereof, as illustrated in FIG. 5.

A slit light stop 72 with a slit 74 is located in the reference plane 68. The whole slit light stop may be located in one plane. It is, however, advantageous, is the lefthand portion 73, as viewed in FIG. 5, of the slit light stop 72 is slightly offset to the top relative to the righthand portion 71. If the whole slit light stop lies in one plane, light beams which are reflected by the surface of the tyre, pass through the slit 74 at a very obtuse angle and impinge upon detectors which are located at quite a distance, lose much intensity, as the effective aperture of the slot is very small for such light beams. This problem is eliminated by the vertical offset of the portions 71 and 73. Thereby, the effective aperture of the slit 74 for obliquely incident light beams is increased without negative effects on the intensity of light beams which pass through the slit 74 nearly at a right angle.

A row 76 of light sensitive detectors isarranged at a distance behind the slit light stop 74. The row 76 lies in a plane containing the axis of the laser beam 66. The longitudinal direction of the row 76 is in crosswise relation with respect to the slit 74. In other words: The laser beam 66 and the row 76 define a plane. This is the plane of the paper in FIG. 5. The slit 74 extends in the reference plane 68 normal to this beam-and-row plane.

The laser beam 66 generates a light spot 78 on the bottom 64 of the tread groove 62. The lateral position of this light spot 78 depends on the depth of the tread groove 62. If the bottom 64 of the tread groove 62 were at the level indicated by the dashed line, a light spot at the point 80 would result. The position of the light spot is observed by an image resolving sensor 82. Here, the image resolving sensor consists of the slit light stop 72 and the row 76 of light-sensitive detectors. From the diffusely reflected light of the light spot 78, a light beam 84 passes through the slit 74 and impinges upon a detector 86 of the row 76. From a light spot 80, a light beam 88 would pass through the slit 74 and impinge upon a detector 90 of the row. It is apparent, that both the lateral displacement of the light spot to the left in FIG. 5 and the vertical displacement to the top in FIG. 5 causes the light beam 84 or 88, respectively, to tilt clockwise about the slit 74. This causes the light beam to impinge on a detector located further to the right of row 76. Thus the image of the light spot on the row of light-sensitive detectors permits conclusions as to the position of the bottom 64 relative to the reference plane 68 and, thereby, as to the depth of the tread groove 62.

Quantitatively, the following is obtained:

The following designations are used:

t designates the distance of the bottom 64 of the tread groove 62 from the reference plane.

α designates the angle between the laser beam 66 and the normal 70 to the reference plane.

β designates the angle between the light beam 84 and the normal 70 to the reference plane.

a designates the horizontal distance, as viewed in FIG. 5, between the beginning of the row 76 of light-sensitive detectors and the slit 74.

b designates the horizontal distance, as viewed in FIG. 5, between the piercing point of the laser beam 66 through the reference plane 68 and the slit 74.

c designates the vertical distance, as viewed in FIG. 5, between the reference plane 68 and the row 76 arranged above the reference plane.

d designates the horizontal distance, as viewed in FIG. 5, between the slit 74 and the point of incidence of the light beam 84 on the row 76 of light-sensitive detectors.

e designates the distance of the point of incidence of the light beam 84 on the row 76 from the origin of the row 76.

f designates the horizontal distance, as viewed in FIG. 5, between the piercing point of the laser beam 66 through the reference plane 68 and the light spot 78.

g designates the horizontal distance, as viewed in FIG. 5, between the light spot 78 and the slit 74.

The following relations are valid:

(1) $e=a+d$ (2) $b=f+g$ (3) $f=t\ \tan\alpha$ (4) $g=t\ \tan\beta$ (5) $d=c\ \tan\beta$.

Putting in equations (3) and (4) into equation (2) yields:

$b = t\ \tan\alpha + t\ \tan\beta$ $b/t = \tan\alpha + \tan\beta$ $\tan\beta = b/t - \tan\alpha$ (6) $\beta = \arctan(b/t - \tan\alpha)$ Putting in equation (5) into equation (1) yields (7) $e = a + c\ \tan\beta$.

Putting in equation (6) into equation (7) yields:

$e = a + c\ \tan[\arctan(b/t - t\ \tan\alpha)]$ $e = a + c\ (b/t - \tan\alpha)$ $(e-a)/c = b/t - \tan\alpha$ $(e-a)/c + \tan\alpha = b/t$ (8) $t = b/((e-a)/c + \tan\alpha)$ This represents the looked-for depth of the tread groove 68 (referenced to the reference plane 68) as a function of the position, in the row 76, of the detector 86 observing the light spot 78. The quantities a, b and c are constants of the apparatus. The depth t is the smaller the larger (e−a) is, i.e. the farther to the right of slit 74, as viewed in FIG. 5, the detector hit by the light beam 84 is located. This is immediately apparent when looking on the dashed light beam 88 in FIG. 5. With identical position of the "exposed" detector such as 84, the depth is the larger, the larger c is. If the row 76 with the detector 86 is displaced to the top in FIG. 5, i.e. makes the distance c between the row 76 and the reference plane 68 is made larger, the light beam will rotate counter-clockwise about the slit 74. Therefore, the light beam 84 intersects the laser beam 66 further down in FIG. 5. Eventually, the measured depth "t" is, with the remaining geometry unchanged, smaller, if α becomes larger, thus the laser beam 66 is rotated counter-clockwise in FIG. 5 about its piercing point through the reference plane 68.

The following values of the constants of the apparatus have been found advantageous:

$\tan\alpha = 0.286 \leftrightarrow \alpha = 15°$ a=0.2 mm b=12 mm c=5 mm

Figure 6:
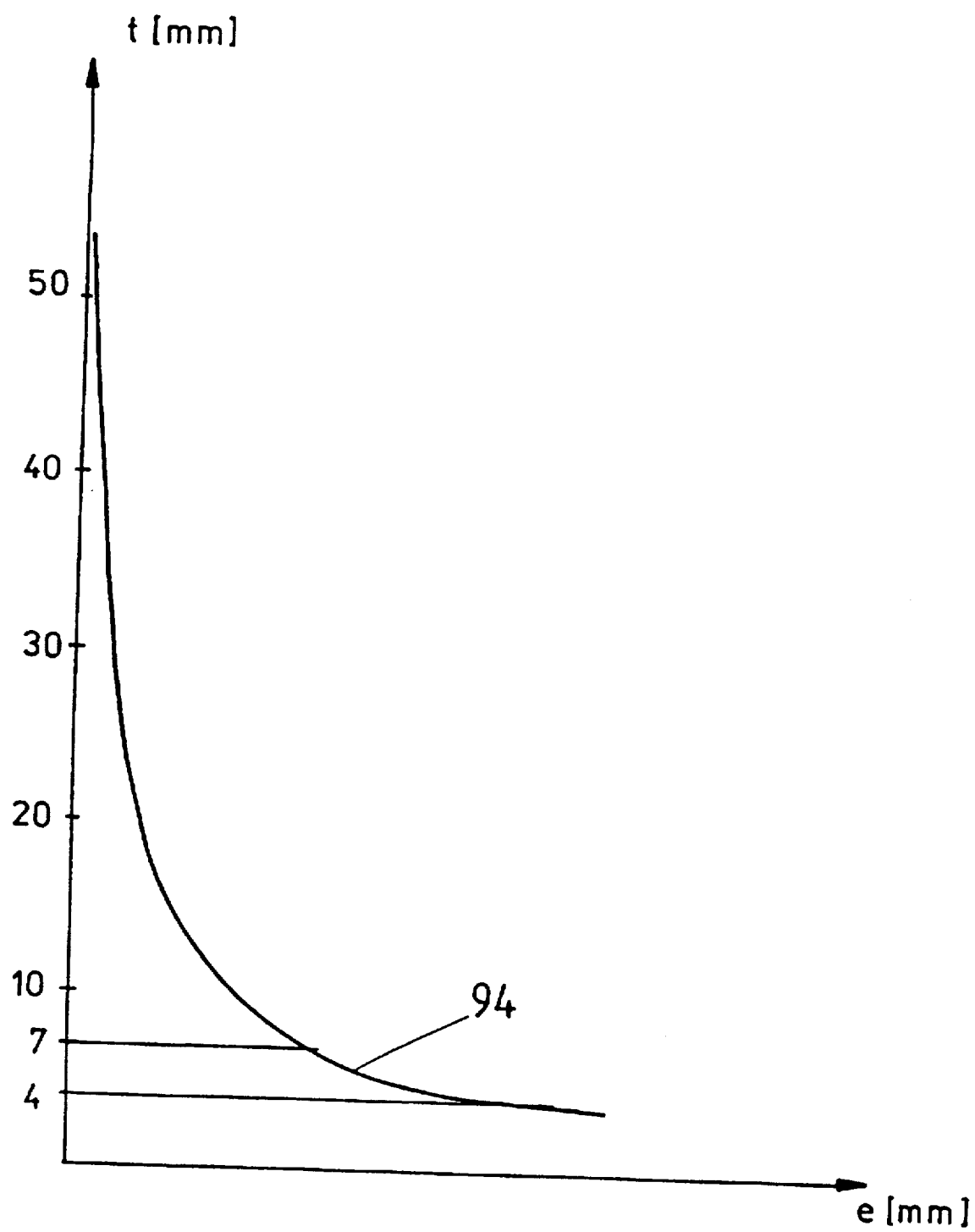
FIG. 6 is a diagram and illustrates, for the laser measuring head of FIG. 5, the depth of the tread groove as a function of the position of the light spot generated by the laser and observed on the bottom of the tread groove.

These values yield the diagam illustrated in FIG. 6 of the relation between the depth "t" and the position of the light spot 78 on the bottom of the tread groove 62 as observed by the sensor 82, namely the distance "e" in the image plane containing the row 76. This diagram represents the function of equation (8).

The laser measuring head is so designed, that the reference plane 68 is spaced from the surface 92 of the tyre between the tread grooves by about 4 millimeters. The critical tread depth is between 0 and 3 millimeters. Therefore, the measuring range in which the laser measuring head has to operate with high resolution is between 4 and 7 millimeters. This is the solidly drawn range 94 in the diagram of FIG. 6. It will be noted that within this range a small change of the depth "t" is associated with quite large a change of the position "e" of the light-sensitive detector hit by the light beam 84. The row 76 of light-sensitive detectors contains about 8 detectors per millimeter, whereby 8 points per millimeter can be resolved. This yields a theoretical depth resolution of about 0.1 to 0.2 millimeters.

When carrying out these measurements, the laser measuring head 42 is guided across the tread. Maxima of the measured depths are determined as depths of the tread grooves 62 of the tyre tread. The procedure will now be described with reference to FIGS. 7 and 8:

At first, the laser measuring head 42 is placed on the tyre 54 (FIG. 3). This is represented by block 104 in FIG. 7. Preferably, the laser measuring head 42 is placed on an edge of the tyre. Measurement is started (block 106) by pushing one of the four push-buttons of the operator device 50 (FIG. 1). By actuating the push-button, the laser 67 (FIG. 5) will be switched on and an acoustic and optical start signal is generated, by which the operator is informed that the measurement takes place properly. Then the laser measuring head 42 is guided transversely across the tyre tread (block 108), the measured values "e"(FIG. 5) being sampled (block 110). This is achieved in that the light-sensitive detectors (for example photodiodes) of the linear array 76 (for example diode array with 128 diodes) convert the intensity of the light to which the respective diode is exposed into a voltage proportional to the respective voltage. In general, because of a certain beam spread of the rays behind slit 74 (FIG. 5), not only one diode is exposed to light but also neighboring diodes. These voltage values are read out at a certain clock frequency T and are converted by an A/D-converter to digital values (8 bit). These digital values are stored in a FIFO-register (256 kB).

After the laser measuring head 42 has been guided once or several times across the tyre tread, the measurement will be terminated by releasing the pushed push-button of the operator device 50 (block 112). Then the measured values are processed. This is illustrated by block 114 and will be described in greater detail later with reference to FIG. 8. The results of the processing are stored (block 116). By an optical and acoustic result signal (block 118), the operator is informed of whether the measurement was successful. Now the operator decides, whether further tyre treads are to be measured (block 120) or the measuring results are to be outputted (block 122). The outputting of the measuring results is initiated by actuating a pushbutton by which the printer 30 is activated.

Figure 7:
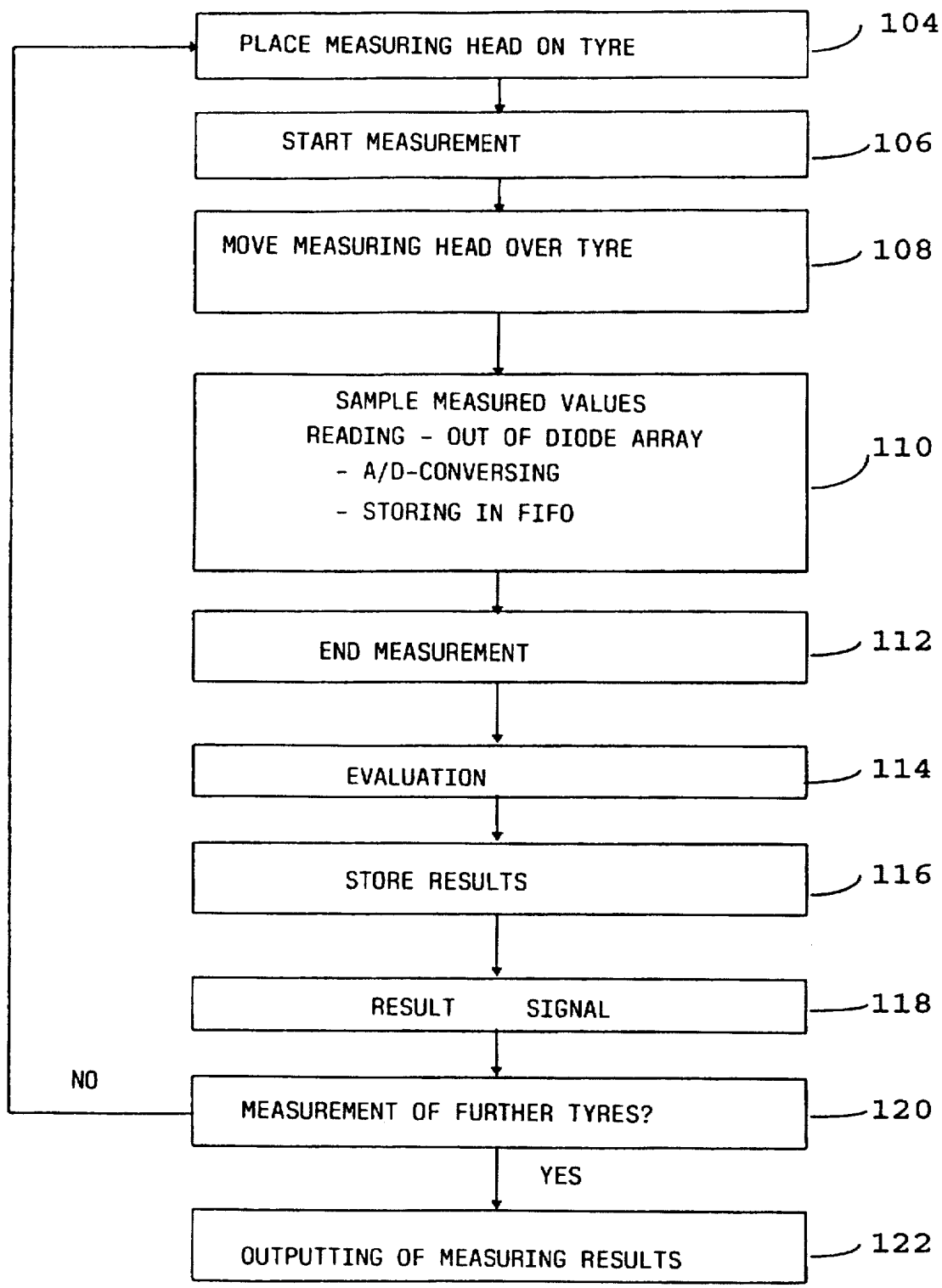
FIG. 7 is a perspective view of a second embodiment of a mobile measuring device for measuring he tread depth of tyres of motor vehicles.
Figure 8:
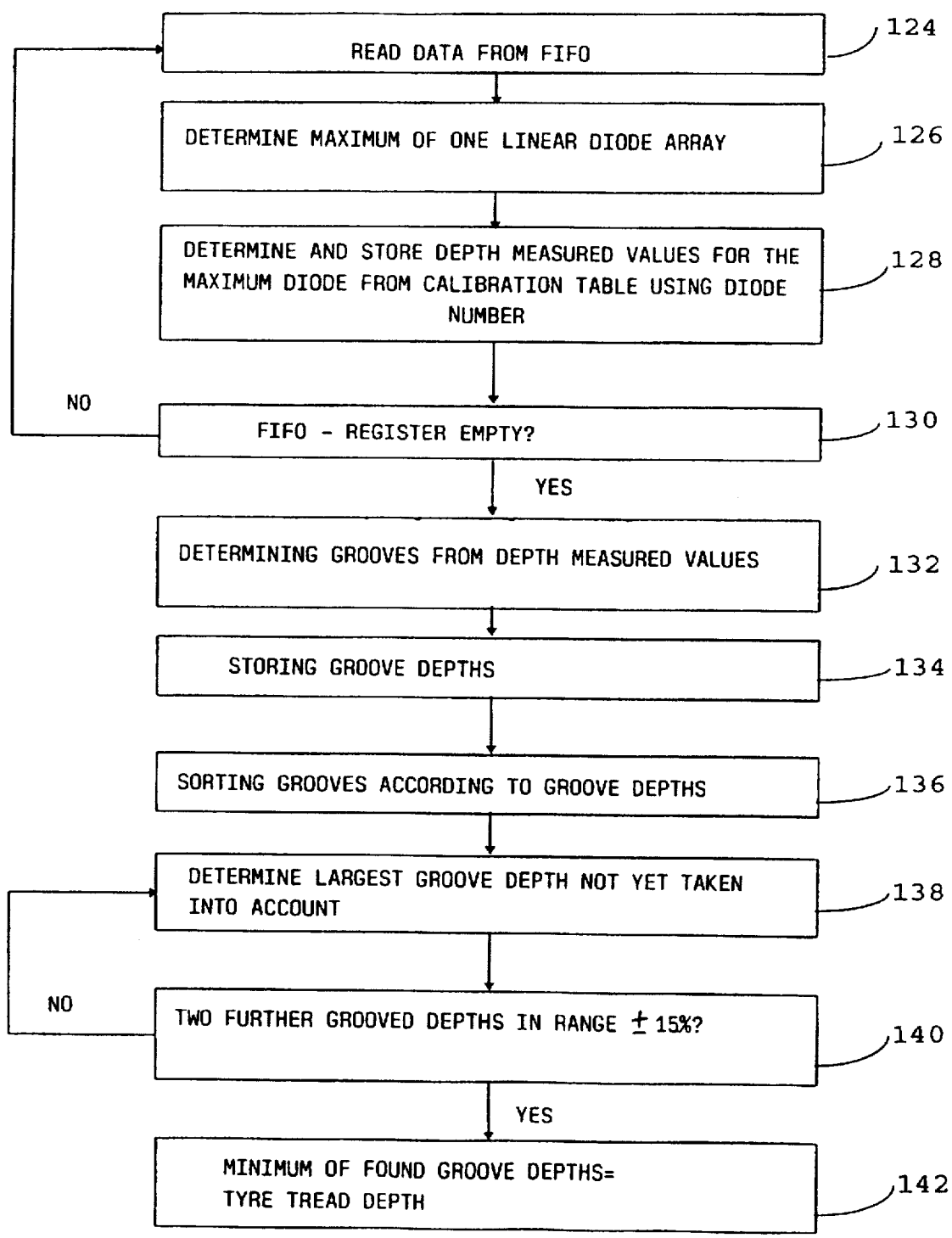
FIG. 8 is a flow diagram and illustrates the data processing when measuring the tyre tread depths.

The processing of the measured values represented by block 114 in FIG. 7 is described in greater detail with reference to FIG. 8. At first, the data read-in into the FIFO-register (block 110, FIG. 7) with the first clock signal are read out (block 124). The maximum value of these data is determined. The corresponding address in the FIFO-register is equal to the number of the diode which was exposed to the highest intensity of the laser light during the respective measurement. Now the depth value t (FIG. 5) corresponding to this diode is determined. This is illustrated by block 128. The diode number is compared with a calibration table stored in a memory. Then the respective depth measured value is obtained from the calibration table. This depth measured value is stored. There will be a query whether the FIFO-register is empty (block 130). If the FIFO-register is not empty, the data are read out which had been read in during the next clock signal (block 124), and the procedure represented in blocks 126 to 130 is carried out. This is illustrated by block 132. The processing consists in determining the grooves of the tyre from the depth measured values. Depth values of 0 mm represent the surface of the tyre. If a certain number (for example, 10) of successively stored depth measured values are different from 0 mm, then these and the following depth measured values, until the depth measured value of 0 mm occurs again, are associated with a groove. In this way a certain number of grooves is obtained depending on how many grooves have been covered by the laser measuring head during measurement.

The depths of the individual grooves are determined as follows: Starting from the maximum depth measured value, it is investigated, how many further depth measured values lie within a limit of, for example, +/−15% from this depth measured value. If more than 5 such depth measured values are present, the smallest of these depth measured values is defined as actual groove depth. If less than 5 such depth measured values are present, it is started from the next higher depth measured value and the same procedure repeated, until the groove depth is obtained.

The number of the grooves thus determined and the respective groove depths are stored (block 134). Now the groove depths are evaluated. At first, the grooves are sorted with respect to groove depth (block 136). Then, similar to the determination of the depths of the individual grooves, it is started from the maximum groove depth (block 138) and investigated, how many further groove depths lie within a limit of, for example, +/−15% from this groove depth. If at least two further groove depths lie within this limit (block 140), the smallest of these groove depths is defined to be the actual tyre tread depth value (block 142). If less than two such groove depths are found, it is started from the next larger groove depth (block 138) and the same procedure is repeated, until the tyre tread depth value is obtained.

The parameters α, and a, b, c can be measured and can be adjusted directly. The parameters may, however, also be determined by calibration. To this end, four parts having known, different tread depths are measured. With each known "t" the associated "e" is determined. This results in four equations of the form of equation (8) with known "t" and known "e". From these four equations, the four parameters α, a, b und c can be determined.

Figure 9:
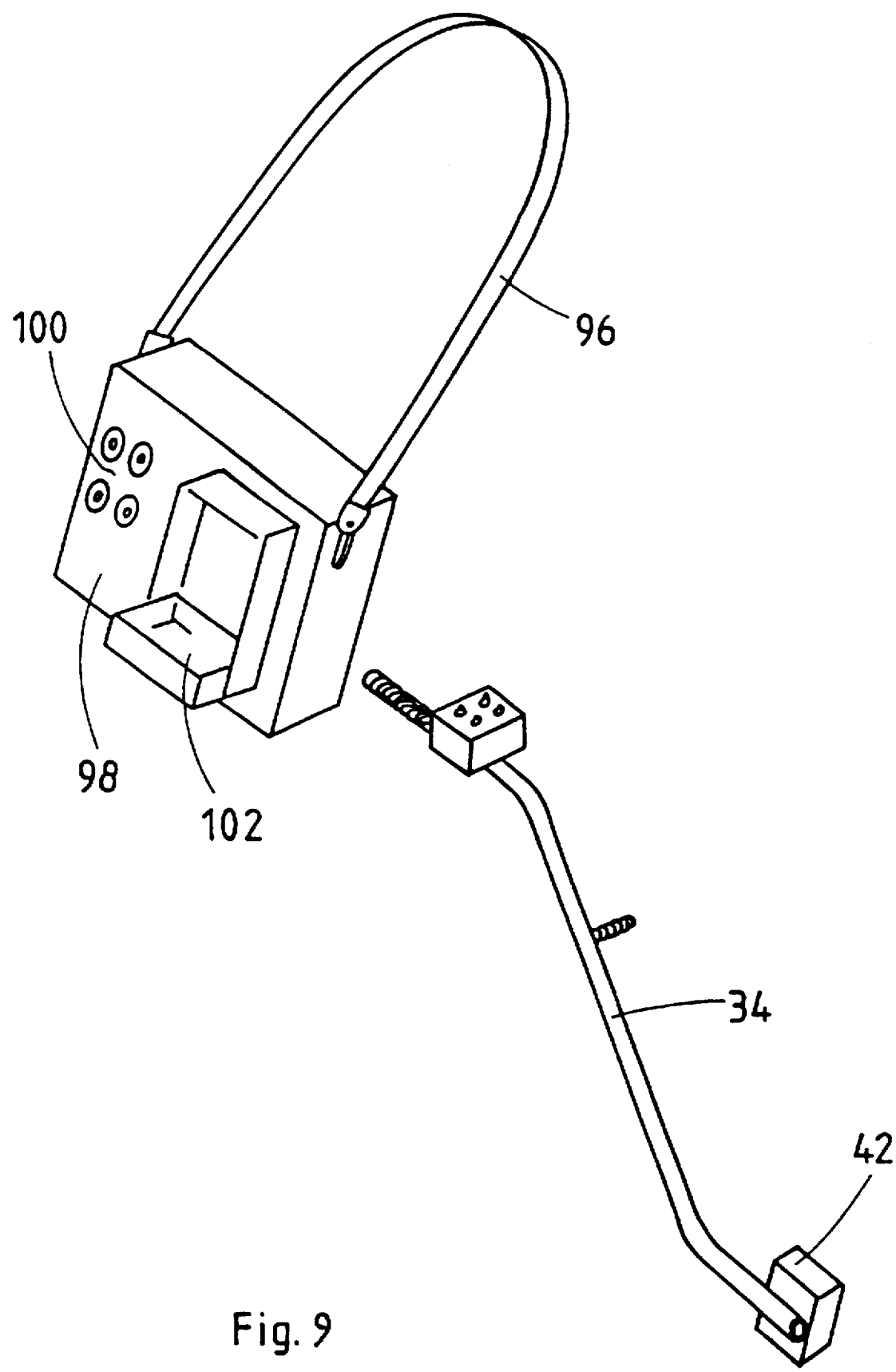
FIG. 9 is a view of a second embodiment of a mobile measuring device for measuring the tread depth of the tyres of motor vehicles.

With a second embodiment of the mobile measuring device of the invention shown in FIG. 9, printer, battery and the whole electronic system of the measuring device are contained in one housing 98, which can be carried by means of a shoulder strap 96. The rod 34 and measuring head 42 are of similar design as in the embodiment shownin FIG. 1. In this embodiment, however, the control and signal transfer electronics 48 (FIG. 1) is not attached to the rod 34 but is accommodated in the housing 98. Such a compact design of the measuring device of the invention is, in particular, made possible by selecting a smaller battery and a smaller printer. Control knobs 100 and a printer delivery chute 102 are provided at the front face of the housing 98. The mode of operation of the second embodiment of the invention is identical with that of the first embodiment.

Furthermore, the mobile measuring device may be equipped with a display screen. Then the measured values may be checked before being printed out.

The measuring device of the invention may also be designed as a stationary measuring device. It may be inserted into already existing brake testing installations or car washing systems. To this end, the measuring head is, for example, sunk in a road surface and is moved across the tyre tread if a tyre is located above the measuring head. The power supply is effected through the mains. The measuring values of the tyre tread depth may be integrated into measuring protocols already existing for the brake test.

I claim:

1. A measuring device for measuring the tread depth of a motor vehicle tyre comprising:
   (a) a laser for generating a laser beam, which is directed to the tread surface of the motor vehicle tyre to generate a light spot thereon;
   (b) an image resolving sensor arranged to observe the position of the light spot;
   (c) signal processing means designed to generate, from position data, a measured value indicative of the tread depth of one or more tread grooves of the tyre tread; characterized in that:
   (d) the laser and the image resolving sensor are accommodated within a common housing to provide a laser measuring head;
   (e) the laser measuring head having an engagement surface permitting the laser measuring head to be brought into engagement with the motor vehicle tyre, whereby the laser and the image resolving sensor are positioned in a well-defined position relative to the motor vehicle tyre;
   (f) the laser and the image resolving sensor are fixedly arranged relative to the engagement surface; and
   (g) the measuring head including the laser, the image resolving sensor and the engagement surface defines a manually portable unit, the laser measuring head of which is capable of being swept manually over the tyre tread.

2. A measuring device as claimed in claim 1, further including a printer and a battery which are accommodated within a common housing.

3. A measuring device as claimed in claim 2, characterized in that all components of the signal processing means, the battery and the printer are accommodated within a common housing.

4. A measuring device as claimed in claim 2, characterized in that the laser measuring head is connected with the housing through a flexible cable.

5. A measuring device as claimed in claim 1, characterized in that the laser measuring head is attached to the end of a rod which permits convenient movement of the laser measuring head into contact with the tyre of a parked motor vehicle.

6. A measuring device as claimed in claim 5, characterized in that the rod is substantially z-shaped and has a bent-off handle end, a long median portion and a measuring head end bent-off substantially parallel to the handle end and carrying the laser measuring head.

7. A measuring device as claimed in claim 1, characterized in that the image resolving sensor comprises a linear array of light sensitive detectors which extends in a plane containing the laser beam, and imaging means, which image the light spot generated on the tread surface of the motor vehicle tyre on the array.

8. A measuring device as claimed in claim 7, characterized in that the imaging means are a slit light stop having a slit extending crosswise to the linear array.

9. A method of measuring the tread depth of a motor vehicle tyre by means of a laser measuring head containing a laser, an image resolving sensor and an engagement surface, the laser and image resolving sensor fixedly arranged relative to the engagement surface, wherein:
  (a) the laser measuring head is brought manually into engagement with the motor vehicle tyre, whereby the engagement surface contacts the tyre tread;
  (b) the laser beam of the laser is directed through the engagement surface at an angle onto the tread surface, whereby a light spot is generated thereon;
  (c) the position of the light spot is observed by means of an image resolving sensor and a measure of the tread depth of one or more tread grooves of the tyre tread is derived therefrom; and
  (d) the laser measuring head is swept manually over the tyre tread to generate measured values of a plurality of tread grooves, from which a measure of the tread depth is determined.

10. A method as claimed in claim 9, characterized in that the relation between the depth of the tyre tread and the position of the light spot as observed by the image resolving sensor is determined by calibration with treads of known tread depth.

11. A measuring device for measuring the tread depth of a motor vehicle tyre comprising:
  (a) a laser for generating a laser beam, which is directed to the tread surface of the motor vehicle tyre to generate a light spot thereon;
  (b) an image resolving sensor arranged to observe the position of the light spot;
  (c) signal processing means designed to generate, from position data, a measured value indicative of the tread depth of one or more tread grooves of the tyre tread; characterized in that:
  (d) the laser and the image resolving sensor are accommodated within a common housing to provide a laser measuring head;
  (e) the laser measuring head having an engagement surface permitting the laser measuring head to be brought into engagement with the motor vehicle tyre, whereby the laser and the image resolving sensor are positioned in a well-defined position relative to the motor vehicle tyre;
  (f) the measuring device furthermore comprises:
    (f1) a printer for printing output data indicative of tread depth; and
    (f2) a battery for the power supply of the laser, of the sensor and of the printer;
  (g) the measuring device being a mobile unit; and
  (h) the laser measuring head is attached to the end of a substantially Z-shaped rod which has a bent-off handle end, a long median portion and a measuring head end bent-off substantially parallel to the handle end carrying the laser measuring head, which permits convenient movement of the laser measuring head into contact with the tyre of a parked motor vehicle.

12. A measuring device for measuring the tread depth of a motor vehicle tyre comprising:
  (a) a laser for generating a laser beam, which is directed to the tread surface of the motor vehicle tyre to generate a light spot thereon;
  (b) an image resolving sensor arranged to observe the position of the light spot;
  (c) signal processing means designed to generate, from position data, a measured value indicative of the tread depth of one or more tread grooves of the tyre tread; characterized in that:
  (d) the laser and the image resolving sensor are accommodated within a common housing to provide a laser measuring head;
  (e) the laser measuring head having an engagement surface permitting the laser measuring head to be brought into engagement with the motor vehicle tyre, whereby the laser and the image resolving sensor are positioned in a well-defined position relative to the motor vehicle tyre;
  (f) the measuring device furthermore comprises:
    (f1) a printer for printing output data indicative of tread depth; and
    (f2) a battery for the power supply of the laser, of the sensor and of the printer;
  (g) the measuring device being a mobile unit; and
  (h) the image resolving sensor comprises a linear array of light sensitive detectors which extends in a plane containing the laser beam, and imaging means which are a slit light stop having a slit extending crosswise to the linear array which image the light spot generated on the tread surface of the motor vehicle tyre on the array.

13. A measuring device for measuring the tread depth of a motor vehicle tyre, comprising:
  (a) a laser for generating a laser beam, which is directed to the tread surface of the motor vehicle tyre to generate a light spot thereon;
  (b) an image resolving sensor arranged to observe the position of the light spot;
  (c) signal processing means designed to generate, from position data, a measured value indicative of the tread depth of one or more tread grooves of the tyre tread; characterized in that:
  (d) the laser and the image resolving sensor are accommodated within a common housing to provide a laser measuring head;
  (e) the laser measuring head having an engagement surface permitting the laser measuring head to be brought into engagement with the motor vehicle tyre, whereby the laser and the image resolving sensor are positioned in a well-defined position relative to the motor vehicle tyre;
  (f) the image resolving sensor comprises a linear array of light sensitive detectors which extends in a plane containing the laser beam, and imaging means which are a slit light stop having a slit extending crosswise to the linear array which image the light spot generated on the tread surface of the motor vehicle tyre on the array; and (g) the measuring device being a mobile unit.

14. A measuring device for measuring the tread depth of a motor vehicle tyre, comprising:

(a) a laser for generating a laser beam, which is directed to the tread surface of the motor vehicle tyre to generate a light spot thereon;

(b) an image resolving sensor arranged to observe the position of the light spot;

(c) signal processing means designed to generate, from position data, a measured value indicative of the tread depth of one or more tread grooves of the tyre tread; characterized in that:

(d) the laser and the image resolving sensor are accommodated within a common housing to provide a laser measuring head;

(e) the laser measuring head having an engagement surface permitting the laser measuring head to be brought into engagement with the motor vehicle tyre, whereby the laser and the image resolving sensor are positioned in a well-defined position relative to the motor vehicle tyre;

(f) the measuring device being a mobile unit; and (g) the laser measuring head is attached to the end of a substantially Z-shaped rod which has a bent-off handle end, a long median portion and a measuring head end bent-off substantially parallel to the handle end carrying the laser measuring head, which permits convenient movement of the laser measuring head into contact with the tyre of a parked motor vehicle.

* * * * *